United States Patent Office 3,025,465
Patented Mar. 13, 1962

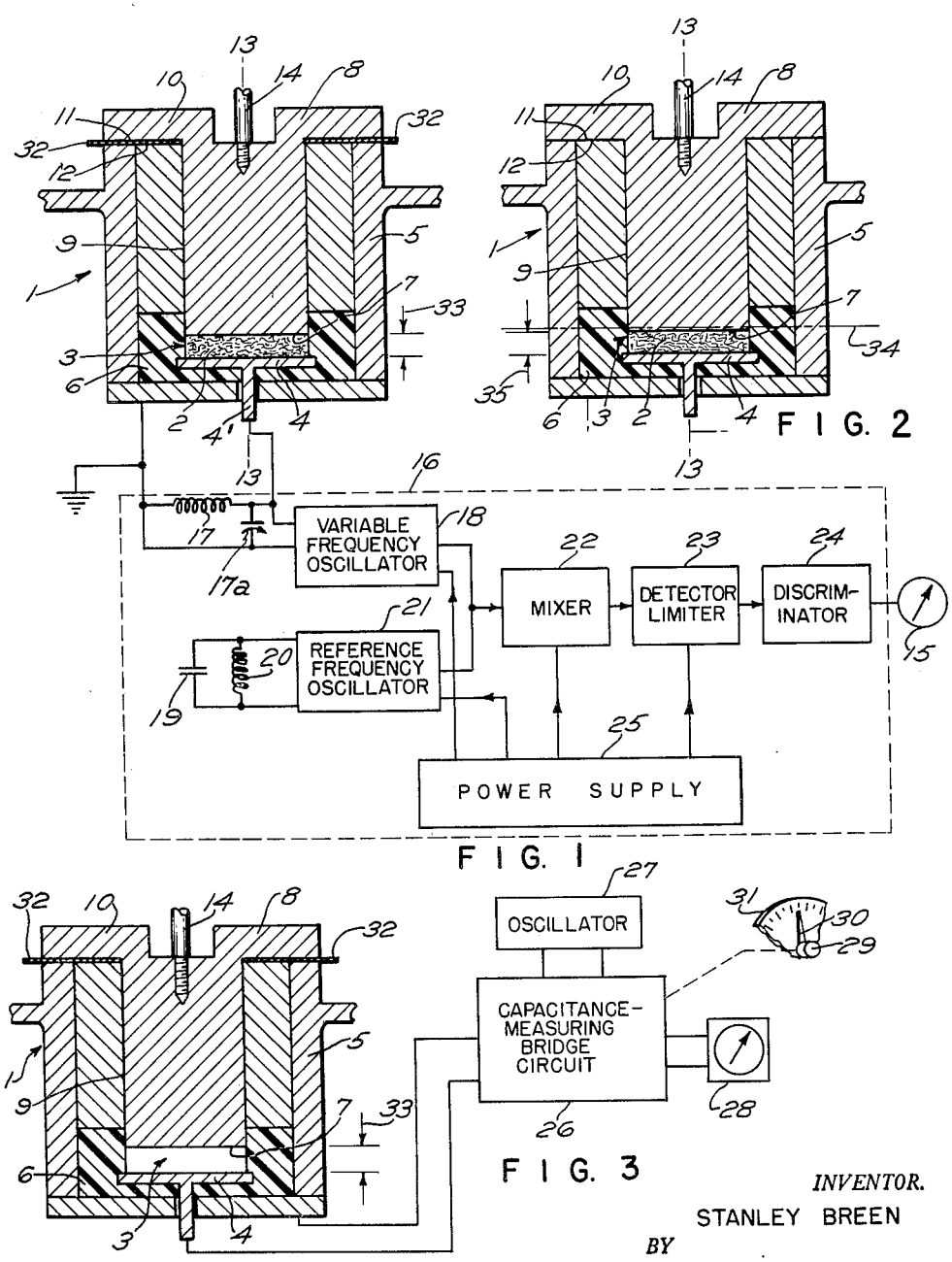

3,025,465
MEASUREMENT OF CAPACITIVITY OF MATERIALS
Stanley Breen, Norwood, Mass., assignor to Forte-Fairbairn Inc., Norwood, Mass., a corporation of Delaware
Filed Oct. 12, 1959, Ser. No. 845,780
4 Claims. (Cl. 324—61)

The present invention concerns improvements in measurement of the characteristics of materials which are related to capacitivity thereof, and, more particularly, to novel and improved method and apparatus for measuring dielectric constants and related properties of certain materials independently of long-period drift effects in measurement apparatus.

Capacitivity of a substance, i.e., its effect upon the capacity of a capacitor test cell, is related to certain properties which may be highly important in industrial control and processing operations. Perhaps the principal interest along these lines has developed in connection with the moisture content property of substances, and it has been known to seek precise and high-speed apparatus and methods which might benefit industries such as those involving textiles, chemicals, foodstuffs, and the like. Composition, workability and storage characteristics may be vastly influenced by only minute variations in moisture content from desired conditions, and it has been well recognized, for example, that costly errors may be involved in weaving and spinning operations in the textile industry, or in mixing or chemically combining ingredients in other fields, if the moisture content of stock is not accurately within restricted ranges. An elementary, but costly and laborious, procedure for establishing mosture content includes baking and weighing procedures, although more rapid and uncomplicated measurement has been promised by electronic detection apparatus designed to respond to capacitance effects.

One form of such electronic apparatus is provided with a detector unit comprising a capacitor into which the evaluated sample is placed to serve as a dielectric while the capacitance is measured with the greatest possible exactitude. Capacitance varies with dielectric constant, and the latter in turn varies with composition, moisture content, and other properties of the sample, such that the measurement of capacitance may be taken as an indication of moisture content provided all other properties either remain fixed from sample to sample or are separately determined and afford basis for corrections when necessary. While the principles of such measurement are relatively straightforward, the actual practice is beset with extraordinary problems which result largely from the need to make extremely fine discriminations between values of capacitance differing only very minutely from one another for the values of moisture measurements of interest and for the sizes of samples and test cells which are practical. The percentage changes involved thus become large in relation to drift effects, particularly long-period drift effects, which are common in electronic circuitry, and precision is generally wanting even when special precautions are observed to minimize such effects. Thermally-induced dimensional variations both in the test cells themselves and in other components of the associated electronic circuitry constitute one example of the origins of notorious errors preventing accurate measurements of capacitance, and other changing ambient environmental conditions are likewise sources of errors which cannot be readily eliminated. Although prior attempts at improvement have been in the obvious direction of insulating, shielding, regulating, compensating, and the like, the present teachings instead recognize that measurement of absolute values of a property may be avoided, together with the aforesaid difficulties thereof.

Simple electrical equipment, and testing practices, eliminate the error-inducing factors and permit particularly advantageous determinations of moisture content.

Accordingly, it is one of the objects of the present invention to provide an improved method of determining capacitivity of materials with high precision and independently of long-period drift effects in electrical capacitivity detection apparatus.

A further object is to provide a method of determining moisture content of substances with electronic capacitivity detecting apparatus wherein improved accuracy is realized by establishing differences between capacitivities measured by a single capacitive test cell with two different predetermined plate spacings while the measured substance and a reference substance serve as the sole dielectric.

Another object is to provide apparatus for testing dielectric substances having measurement cavity and adjustable electrode spacing provisions which improve the precision of measurements related to dielectric properties of fluids or fluid-solid mixtures.

By way of a summary account of practice of this invention in one of its aspects, a sample of evaluated material, such as a mass of textile fibers, is interposed between and fills the void between a pair of capacitor test cell plates having a first predetermined spacing, and the resulting capacitance exhibited by the cell is measured with the aid of associated capacitance-measuring equipment. The capacitor plate spacing is next changed to a second predetermined spacing which involves a change in the volume of the void which is small in relation to the total first volume, and which thus involves only negligible change in the density of the somewhat compressible material undergoing test, and the resulting capacitivity is then measured. Like measurements are next performed with the identical plate spacings and with the void occupied by air alone, these being accomplished without delay and before relatively long-term drift effects in the measuring equipment can alter its capacitance measurements significantly. For room temperature conditions of measurement, the dielectric constant of the measured material, and hence moisture content information, is found in the ratio of the difference in capacitances measured with the evaluated material to the difference in capacitances measured with air. Knowledge of absolute values of capacitance is not critical to this process.

Although the features of this invention which are believed to be novel are set forth in the appended claims, further details of its practice and the further objects and advantages thereof may be readily comprehended through reference to the following description taken in connection with the accompanying drawings, wherein:

FIGURE 1 provides a cross-sectional view of an adjustable capacitor test cell and associated block-diagrammed electronic capacitivity detection circuit for practice of this invention;

FIGURE 2 illustrates the capacitor test cell of FIGURE 1 with adjusting shims removed during measurement; and FIGURE 3 depicts the same capacitor test cell in condition for performance of one measurement operation, the cell being associated with another form of electrical detection equipment portrayed in block-diagrammed form.

One arrangement of electronic moisture detection equipment which may be employed in the practice of these teachings is shown in FIGURE 1 as including a primary detector in the form of a capacitor test cell 1 adapted to receive a quantity 2 of bulk material, such as wool, cashmere, or other fibers, in a totally confined measurement chamber 3. This test cell has an inner circular electrode or plate 4 which is maintained in a fixed inner coaxial relationship to a surrounding grounded cylindrical electrode 5 by molded insulation 6. Capacitor plate 4 is coupled with external circuitry by way of a lead 4' which is spaced from the outer grounded electrode 5 and is therefore in full insulated relationship to this electrode. The parallel capacitor plate surface 7 which is disposed opposite and in cooperating relationship to the top surface of plate 4 is formed at the lower end of a plunger 8, the cylindrical body 9 of which fits closely within an accommodating cylindrical opening in the outer electrode 5. Annular flange 10 at the upper end of electrically conductive plunger 8 possesses an accurately machined lower annular surface 11, and a like annular surface 12 appears at the upper end of the outer electrode 5 such that these two surfaces may at certain times be brought into a full abutting relationship corresponding to that appearing in the FIGURE 2 illustration. Plunger 8 may be withdrawn from and reinserted into the central opening in electrode 5 along the direction of axis 13—13, preferably with the aid of a suitable mechanized device actuating the necessarily large plunger by way of the shaft 14, whereby the evaluated material may be readily inserted into and removed from the measurement cavity 3 and the cavity size may also be critically altered in performing certain of the measurement operations. The uniform electrostatic flux field which is established in the cell cavity involves lines of flux which extend between and are substantially normal to the oppositely-disposed surfaces of plate 4 and plunger end 7.

Effects of the measured sample 2 upon the exhibited capacitance of the test cell 1 are characterized by the output indications of an instrument 15 actuated by intermediate electrical detection equipment designated by the dashed-line enclosure 16. The detection circuitry may be of a known form, that which is illustrated in block convention being a preferred circuit which places the test cell in a paralleled relationship with an inductance 17 to provide a frequency controller for a variable oscillator 18. Counterparts of these frequency-controlling elements are found in a paralleled reference capacitor 19 and inductance 20 which tune a reference frequency oscillator 21. Output frequencies of variable oscillator 18 are related to the dielectric constants of the materials within test cell cavity 3, while the output frequencies of reference oscillator 21 remain substantially fixed. Frequency of variable oscillator 18 is also regulated, selectably, by adjustments of an auxiliary turning capacitor 17a to establish predetermined frequency differences during the various measurement intervals. Combination of the two oscillator outputs, as by an adding mixer circuit 22, yields one component of further output signals which is substantially equal to the differences between oscillator frequencies and which is preferably within an audio frequency range. Detector-limiter unit 23 accomplishes a demodulation which results in a signal of frequencies substantially equal to the existing difference in oscillator frequencies, and amplitude irregularities are eliminated in a limiting operation, such that the output of this unit is caused to be in the form of pulses of uniform amplitude and of periodicities corresponding to differences in output signals generated by variable and reference oscillators 18 and 21. Discriminator 24, which is preferably of a non-resonant type, is excited by the pulse signal output of detector-limiter 23 and delivers curernt through instrument 15, preferably an ammeter, which is related to the aforesaid frequency differences. Preferably, the circuits and circuit elements which require energizing from a major power source are excited by a regulated power supply 25. If desired, full details of certain circuitry which may be employed in a measuring system such as that described may be perceived through reference to my copending application for "Apparatus and Method for Measuring Capacitivity of a Material," Serial No. 691,269, filed October 21, 1957 and asigned to the same asignee as that of the present application. It will be recognized that a system of the foregoing character will yield output indications accurately related to dielectric properties of the materials under evaluation in test cell 1.

Provided that the power supply regulation is highly precise and that all critical circuit components are well shielded, isolated and relatively proportioned to suppress production of erroneous indications, very high precisions can be realized. These techniques of course affect cost, and, further, even the most sensitive accurate instruments are subject to disturbance by severe variations in environmental conditions of use and as a consequence of aging effects. This is particularly true where the associated indicating instrument, such as instrument 15, is directly calibrated in terms of the measured percentage moisture, dielectric constant, or other quality. The possibility that relatively long-term variations may affect output unfortunately requires that recalibration or circuit adjustments be made, the requirement being more onerous as the equipment is less refined and more susceptible to drift. For example, in the FIGURE 3 arrangement of more simplified equipment, the same cell 1 is merely associated with a known type of capacitance bridge circuit 26, which rceives excitation from an oscillator 27 and can provide output indications of capacitivity by way of an instrument 28 which may be graduated as a direct-reading device or may provide null indications responsive to the manipulations of an adjusting knob 29. In the latter use, the knob adjustments themselves afford indication of the measured capacitivity by way of an associated pointer 30 and dial 31, in a known manner. Factors such as oscillator frequency drift, mechanical backlash in adjustment mechanisms, and humidity- and thermally-induced changes in electrical characteristics of circuit elements in the bridge legs, are obvious sources of error which would tend to make measurements unreliable and would necessitate frequent corrections and recalibrations.

However, the particular practice detailed herein suffices to overcome these principal advantages and occasions improvement in accuracy with both the more refined and simplified equipments. Indications of the instruments 15 and 28 or of the dial and pointer 31 and 30 may be dimensionless, that is, they need not represent the actual values of capacitance, dielectric constant, percentage moisture, and the like. However, the measurements made should have numerical values which are in substantially linear relationship to the capacitivities experienced by a test cell, such that these dimensionless numerical values can be employed to characterize the property being measured. This invention recognizes that a highly significant relationship of dimensionless data can be obtained from four simple measurements performed with special apparatus. This relationship yields the value of dielectric constant of the evaluated sample, provided the measurements are made under certain conditions which are satisfied in the testing apparatus and provided the measurements are in terms of numerical values having the aforesaid linear relationship. One of the conditions for successful practice of the invention is that all the measurements be provided by a test cell having a substantially fixed capacitance plate area, and another is that the capacitor plates be precisely adjustable to two predetermined spacings of small dimensional differences with accurate repeatability. In the latter connection, the volume of the cavity and the capacitor plate area must both be large enough to insure that distinctly different measurements will nevertheless be obtained from the detection apparatus, even though the plate spacings may be changed only minutely to prevent significant alteration of the density of the sample between the plates. Further, the full required set of measurements should be performed without delay of duration which might permit the aforesaid drift effects to add errors.

The test cell apparatus 1 in the illustrations satisfies the requirements of providing a cavity 3 of substantial volume between plate surfaces which are of relatively large area, a typical cylindrical cavity size being one about 0.70 centimeter in height and about 10.8 centimeters in diameter, the latter dimension being that of the plate surface 7 at the lower end of the movable plunger 8. A relatively large volume proves to be desirable for the further reason that it enables better statistical results to be secured with the measured samples of corresponding volume. With the plunger 8 raised along axis 13—13 and completely removed from the accommodating opening in grounded outer electrode 5, a known quantity of wool fibers is placed within the cavity 3 and the plunger is then partially nested within electrode 5 such that the fibers are lightly compacted in the process. Before the flanged surfaces 11 and 12 are engaged, a plurality of thin flat shims 32 are disposed between these surfaces at a plurality of angular positions, such as at 120° positions, about the annular flange. It is essential that these shims be flat and of a uniform predetermined thickness which will cause the plunger end surface 7 to be located accurately at a predetermined height, height 33 in FIGURES 1 and 3, from the upper surface of the cooperating capacitor plate 4 when the flange surfaces 11 and 12 are firmly engaged with the shims 32. A shim thickness of 0.005 inch is satisfactory for the cell which has been described, for example. Measurement is made through the detection apparatus with the filled cell set at the spacing 33, and whatever reading is obtained, though it be of an absolute figure, $x_1$, not itself disclosing the value of cell capacitance, will be known to evidence the existing capacitance, $C_1$, in micromicrofarads, in accordance with the relationship:

$$x_1 = kC_1 + C_0 = \frac{0.22 A \epsilon_1}{d_1} + C_0 \mu\mu f$$

where $k$ is a constant,
$A$ is the capacitor plate effective area, in inches,
$d_1$ is the plate spacing, in inches,
$\epsilon_1$ is the dielectric constant exhibited by the evaluated sample of moist wool fibers, and
$C_0$ is the capacitance of auxiliary tuning capacitor 17a and of any other distributed capacitance in the tuning circuit.

The shims 32 are next removed, and the test cell plunger depressed to its bottommost fully-seated position, shown in FIGURE 2, in which the flange surfaces 11 and 12 are fully engaged with one another and the plunger end 7 which serves as the movable capacitor plate is lowered from its earlier level 34 to a level producing a minutely smaller plate spacing 35 than existed in the preceding measurement step. This reduction in spacing would be 0.005 inch for the case of shims 32 of this thickness, although it may be otherwise, of course, and it will be shown that in any event it need not be known in its absolute value. Accordingly, a set of like uniform-thickness shims may be used in the measurement process without it being required that they be of a particular thickness, or that their thickness be measured, or that their thickness be prevented from changing with relatively long-period temperature variations. The reduction in plate spacing is intentionally made small, based upon the important recognition that dielectric constant of a mixed bulk of fibers, moisture and air increases as density is increased by closer packing. Appreciable variations in this so-called "filling factor" could thus introduce errors into measurement, and it is necessary that this effect be rendered negligible by altering the plate spacing only slightly. Density effects are further minimized in that the evaluated sample is uniformly compressible and does not tend to become crushed or more heavily packed in but one location as the plunger is depressed to the lower orientation in the cell. A dimensionless instrument indication, $x_2$, is exhibited in the second measurement step, the numerical value of $x_2$ and $x_1$, being preserved in a linear relationship to the cell capacitivity by operating the apparatus on a linear part of its capacitivity vs. numerical output indication characteristic. It is known that:

$$x_2 = kC_2 + C_0 = \frac{0.22 A \epsilon_1}{d_2} + C_0 \, \mu\mu f$$

where $C_2$ is the existing capacitance with the shims removed and the sample in the measurement cavity, and $d_2$ is the spacing between capacitor plates when the shims are not present.

The tested bulk of fibers 2 is then entirely removed from the measurement cavity 3, and, with air from the ambient atmosphere occupying the cavity, a measurement $x_3$, is made with the shims in position once again, as appears in the FIGURE 3 condition of test cell 1. It is known that $$x_3 = kC_3 + C_0^1 = \frac{0.22 A \epsilon_2}{d_1} + C_0^1 \, \mu\mu f$$

where $C_3$ is the existing capacitance under these conditions,
$\epsilon_2$ is the dielectric constant of the air, and
$C_0^1$ is the capacitance of capacitor 17a at a different setting, together with any distributed capacitance in the tuning circuit.

Repeating the measurement with the cavity empty except for air, and with the shims removed, however, a measurement $x_4$ is made with the apparatus being operated on a part of its characteristic curve which places the numerical values of $x_4$ and $x_3$ in the same linear relationship to capacitivity as in the instances of measurements $x_1$ and $x_2$. Tuning condenser 17a may be adjusted to achieve the desired operating characteristic, for example. It is established that:

$$x_4 = kC_4 + C_0^1 = \frac{0.22 A \epsilon_2}{d_2} + C_0^1 \, \mu\mu f$$

where $C_4$ is the cell capacitance with air in its measurement cavity and with the shims absent.

The difference between measurements $x_1$ and $x_2$, $\Delta x_2$, may then be expressed as:

$$x_2 - x_1 = k(C_2 - C_1) = k\Delta C_2 = 0.22 A \epsilon_1 \left(\frac{1}{d_2} - \frac{1}{d_1}\right)$$

and the difference between measurements $x_3$ and $x_4$, $\Delta x_4$, is found to be:

$$x_4 - x_3 = k(C_4 - C_3) = k\Delta C_4 = 0.22 A \epsilon_2 \left(\frac{1}{d_2} - \frac{1}{d_1}\right)$$

Therefore, $$\frac{\Delta C_2}{\Delta C_4} = \frac{\epsilon_1}{\epsilon_2}$$

and $$\epsilon_2 = \epsilon_1 \frac{\Delta C_4}{\Delta C_2}$$

Since the dielectric constant $\epsilon_1$ for air at normal temperature and pressure is very nearly unity (1.000586), the dielectric constant $\epsilon_2$ of the bulk of fibers is essentially equal to the ratio of differences in the two measurements with the sample in the cell to the differences in the measurements with air in the cell, or:

$$\epsilon_2 = \frac{\Delta C_4}{\Delta C_2} = \frac{x_4 - x_3}{x_2 - x_1}$$

When a known quantity of clean fibers is involved in the measurement, as established by accurate weighing, for example, the exhibited dielectric constant differs from an established value only in accordance with the percentage moisture, and the latter can be taken from the customary tables or graphs.

While it is especially convenient to perform part of the measurement with air as the reference dielectric substance, the desired relationships may instead be ascertained in the same manner with a reference sample of material the dielectric constant of which is known to be of a certain value. In this method, the dielectric constant which is sought for a measured sample is found by multiplying the known dielectric constant of the reference by the ratio of differences of measurements made using the measured sample to the differences of measurements made using the reference sample. Sensitivity in the responses of the electrical detecting and indicating circuitry is an important factor in determining what test cell plate areas and variations in plate spacing are needed to achieve wanted precisions. If, for example, the capacitor plate area involved is small, the plate spacing would have to be large to accommodate a sample of size needed for good statistical results and to permit a practical dimensional change in plate spacing without unduly compacting or expanding the sample to the point where the aforesaid "filling factor" could introduce serious error. The changes in capacitance which occur with small variations in a relatively large electrode spacing are obviously small also, and the associated detecting equipment would have to be capable of making particularly fine discriminations between sensed capacitances. In general, this signifies that the more intricate and costly detecting equipment would be required. With larger plate area and relatively small plate spacings, the large total measurement cavity volume permits enough of a variation in plate spacing to be introduced, without undue change in sample density, to occasion relatively large and more readily and accurately detectable capacitance variations.

In the case of the two measurements with air as a reference substance in the test cell cavity, the change in spacing of the electrodes 4 and 7 is accompanied by minute leakage of air either into or out of the cavity 2, depending upon direction of the change in spacing. This leakage is permitted by the small clearances which exist between the relatively movable parts. Because of such leakage, there is negligible compression or expansion of the air sample, and the dielectric constant is not altered. A similar advantageous effect occurs when the tested sample itself is a fluid, either gaseous or liquid, and it is then possible to vary the electrode spacings by large amounts without at the same time altering the density and dielectric constants of the sample.

The preceding outline of measurement steps should not be understood as limited to the specific sequence described, since it should be apparent that the measurements with air or another reference sample in the cavity may be made earlier than, or in alternate relationship with corresponding steps in measurements made employing the evaluated sample in the cell, with satisfactory results. Further, where the drift effects in the detection equipment are small or are of a particularly long-term character, as in the case of accurate regulated and compensated equipment, the two measurements with air or other reference sample need only be made once for a plurality of such measurements made with different evaluated samples.

Practice of this invention thus should not be considered limited to the detailed description presented by way of explanation, and those skilled in the art will recognize that modifications may be introduced without departure either in spirit or scope from the invention in its broader aspects.

What I clam as new and desire to secure by Letters Patent of the United States is:

1. The method of testing substances which comprises establishing an electrostatic flux field distributed uniformly through an enclosed cavity between a pair of capacitor plates, filling said cavity with a quantity of said substance and performing a first measurement in terms of numerical values having a substantial linear relationship to capacitivity exhibited between said plates while maintaining said plates in a first spaced relationship, performing a second measurement in terms of said numerical values to characterize capacitivity exhibited between said plates with said same quantity of said substance therebetween and while maintaining said plates in a second spaced relationship which is different from said first relationship and which involves change in the volume of said cavity by an amount insufficient to vary substantially the density of said compressible substance filling said cavity, performing a third measurement in terms of numerical values having said linear relationship to capacitivity between said plates with a reference substance of known dielectric constant value between said plates while maintaining said plates in said first spaced relationship, performing a fourth measurement in terms of the numerical values related to capacitivity as in said third measurement to characterize capacitivity between said plates with said reference substance therebetween while maintaining said plates in said second spaced relationship, and multiplying said known value by the ratio of difference between said first and second measurements to the difference between said third and fourth measurements, whereby to characterize the dielectric characteristic of said sample.

2. The method of testing substances which comprises establishing an electrostatic flux field through all parts of an enclosed cavity between a pair of parallel capacitor plates, filling said cavity with a quantity of said substance and performing a first measurement in terms of numerical values having a substantially linear relationship to capacitivity exhibited between said plates while maintaining said plates in a first spaced parallel relationship, moving one of said plates to change said spaced relationship to a second spaced parallel relationship which is different from said first relationship and which involves change in the volume of said cavity by an amount insufficient to vary substantially the density of said compressible substance filling said cavity, performing a second measurement in terms of said numerical values to characterize capacitivity exhibited between said plates with said same quantity of said substance therebetween and while maintaining said plates in said second parallel relationship, performing a third measurement in terms of numerical values having said linear relationship to capacitivity between said plates with a reference substance of known dielectric constant value between said plates while maintaining said plates in said first spaced relationship, performing a fourth measurement in terms of said numerical values related to capacitivity as in said third measurement to characterize capacitivity between said plates with said reference substance therebetween while maintaining said plates in said second spaced relationship, and multiplying said known value by the ratio of difference between said first and second measurements to the difference between said third and fourth measurement, whereby to characterize the dielectric characteristic of said sample.

3. The method of testing moisture content of compressible substances which comprises establishing an electrostatic flux field through all parts of an enclosed cavity between a pair of parallel capacitor plates having surface area dimensions large in relation to the spacing therebetween, filling said cavity with a quantity of said substance and performing a first measurement in terms of numerical values having a substantially linear relationship to capacitivity exhibited between said plates while maintaining said plates in a first spaced parallel relationship, moving one of said plates to change said spaced relationship to a second spaced parallel relationship which is different from said first relationship and which involves change in the volume of said cavity by an amount insufficient to vary substantially the density of said compressible substance filling said cavity, performing a second measurement in terms of said numerical values to characterize capacitivity exhibited between said plates with said same quantity of said substance therebetween and while maintaining said plates in said second parallel relationship, performing a third measurement in terms of numerical values having said linear relationship to capacitivity between said plates with air between said plates while maintaining said plates in said first spaced relationship, performing a fourth measurement in terms of said numerical values related to capacitivity as in said third measurement to characterize capacitivity between said plates with air therebetween while maintaining said plates in said second spaced relationship, and ratioing the difference between said first and second measurements to the difference between said third and fourth measurement to characterize the dielectric characteristic and moisture content of said sample.

4. Apparatus for testing dielectric substances comprising a hollow cylindrical electrode member having a flat annular surface at one end thereof, a cylindrical plunger member movable into and out of mating engagement with said hollow member and having an annular flange at one end thereof disposed to engage said annular surface of said hollow member, said plunger member having a conductive electrode surface at the other end thereof disposed for orientation within said hollow member, an electrode, means mounting said electrode within said hollow member in insulated relationship with said hollow member and plunger member, said electrode and mounting means defining a substantially closed cavity with said plunger electrode surface when said plunger member is fully mated with said hollow member, flat spacer means of uniform thickness proportioned to fit between and separate said annular surface and annular flange, said spacer means being of small thickness whereby insertion and removal thereof occasion substantially negligible changes in density of a substance filling said cavity, means electrically exciting said electrode and plunger electrode surface to develop electrostatic flux through all parts of said cavity, and indicating means connected to said electrode and plunger electrodes surface for indicating capacitivity therebetween in terms of numerical values having a substantially linear relationship to capacitivity exhibited by each of said substances and by a reference substance within said cavity under conditions with said spacer means inserted and removed from between said annular flange and surface, whereby the dielectric characteristics of each tested substance is characterized by the product of the dielectric constant of said reference substance and the ratio of differences of indications by said indicating means with said tested substance in said cavity to the differences of said indications with said reference substance in said cavity.

References Cited in the file of this patent

UNITED STATES PATENTS

| | | |
|---|---|---|
| 2,021,760 | Whitney | Nov. 19, 1935 |
| 2,082,364 | Store | June 1, 1937 |
| 2,485,579 | Elliott | Oct. 25, 1949 |
| 2,562,575 | Raesler | July 31, 1951 |
| 2,884,593 | Miyata | Apr. 28, 1959 |

FOREIGN PATENTS

| | | |
|---|---|---|
| 131,498 | Australia | Feb. 24, 1949 |

OTHER REFERENCES

Miller et al.: "Measuring Dissipation and Dielectric Constants," Electrical Engineering, June, 1950, p. 512.